(No Model.) 2 Sheets—Sheet 1.
J. S. KLEIN.
MEANS FOR PUMPING LIQUIDS FROM GAS PRODUCING WELLS.
No. 531,537. Patented Dec. 25, 1894.
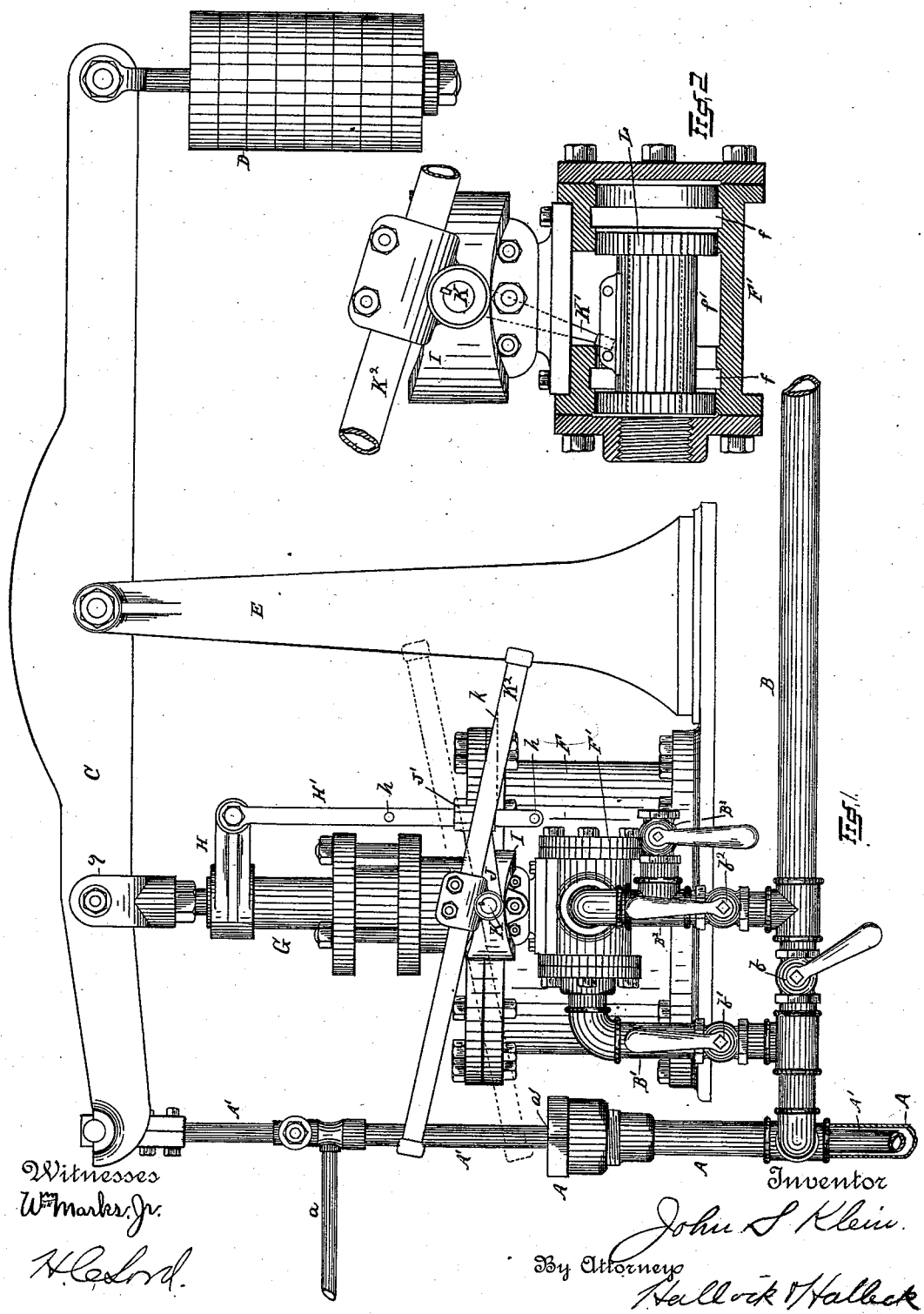

(No Model.) 2 Sheets—Sheet 2.
J. S. KLEIN.
MEANS FOR PUMPING LIQUIDS FROM GAS PRODUCING WELLS.
No. 531,537. Patented Dec. 25, 1894.
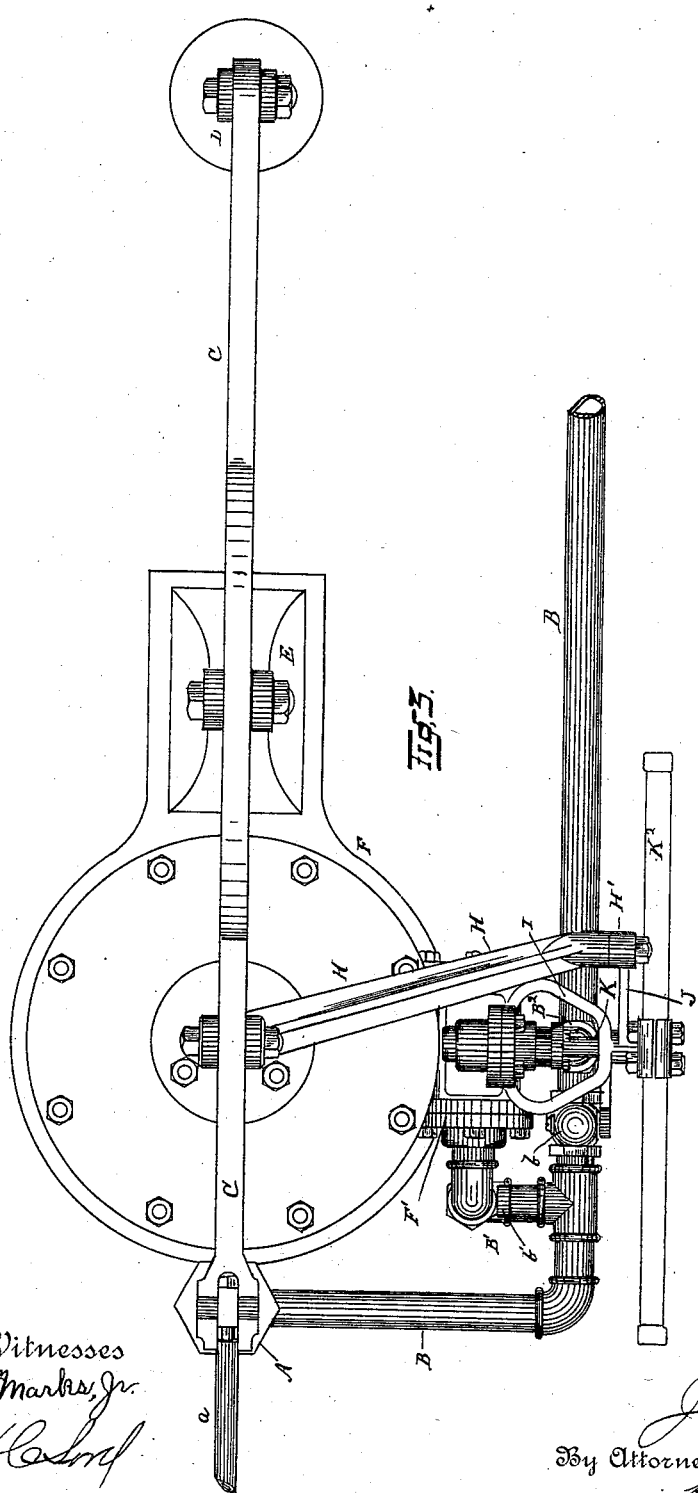

UNITED STATES PATENT OFFICE.

JOHN S. KLEIN, OF OIL CITY, PENNSYLVANIA.

MEANS FOR PUMPING LIQUIDS FROM GAS-PRODUCING WELLS.

SPECIFICATION forming part of Letters Patent No. 531,537, dated December 25, 1894.

Application filed February 2, 1894. Serial No. 498,914. (No model.)

*To all whom it may concern:*

Be it known that I, JOHN S. KLEIN, a citizen of the United States, residing at Oil City, in the county of Venango and State of Pennsylvania, have invented certain new and useful Improvements in Means for Pumping Liquids from Gas-Producing Wells; and I do hereby declare the following to be a full, clear, and exact description of the invention, such as will enable others skilled in the art to which it appertains to make and use the same.

This invention relates to the production of natural gas, and consists in improvements in the means for keeping the gas wells clear of accumulating liquids.

In the production of gas from deep bored wells, it is necessary that that part of the well from which the gas is taken be kept clear of accumulating liquids. It is the common practice to use a packer on the well tubing to shut off the water from above the gas vein, and thereby form below said packer a gas chamber from which the gas flows to the surface through the well tubing; but this does not entirely prevent the accumulation of liquids within the gas chamber for there will be more or less leakage past the packer, and there is often a flow of water into the gas chamber from the rock seams, and often there is a flow of oil from the rock, and hence it becomes necessary to keep the chamber clear of accumulating fluids.

In some cases tubing and rods are inserted within the larger tube, and the liquid is pumped from the well as is the general practice of pumping Artesian and oil wells. In other cases the wells are blown off—which means that the well is opened to the atmosphere and the whole volume of gas is blown into the air, and with it the accumulated fluid is removed from the well in the form of spray. The gas lost in this way is obviously very great.

It is seldom necessary that the pump be operated continuously, and often it does not have to be operated for several days. Hence the maintenance of a steam engine and boiler at the well, which is to be operated only for a few hours or perhaps a few minutes at a time at intervals of several days, is inconvenient and expensive, especially in winter weather when precautions must be taken to prevent the injury or destruction of the plant.

In the production of gas for supplying cities, there are a large number of wells feeding one or more large mains or conduits, and to keep all these wells clear by the old methods, as I have described, requires the constant attention of a number of workmen, and entails a large expense, and a great waste of gas when the liquid is removed by blowing the well off.

The object of my invention is to provide means for operating the pumps by the force of the gas flowing from the well, and thereby causing the well to clear itself automatically and without the waste of gas. To this end I connect the gas eduction tube of the well and the conduit that conveys the gas from the well with an engine adapted to be operated by the pressure or flow of the gas in such a manner that the gas as it passes from the well enters the engine, actuates it and is then discharged into the conduit that conveys the gas to the point of use, or it can be exhausted into the atmosphere if it is not desired to save it.

While I have shown in the accompanying drawings an engine especially adapted to the purpose of my invention and intend to claim its construction as my invention, its use for the general purposes of my invention is not essential, and I do not intend to be limited thereto, for almost any of the many forms of steam engines may be used for the purpose.

My invention is illustrated in the accompanying drawings as follows:

Figure 1 is a side elevation, and shows a gas well tube, A, as it extends above the ground, the conduit, B, for conveying the gas from the well, and an engine for operating the well pump connected with the gas conduit. Fig. 2 is a sectional view to show the construction and operation of the engine valve. Fig. 3 is a top or plan view of the parts shown in Fig. 1.

The well tubing which conveys the gas to the surface is marked, A. The inner or pump tube is marked, A'. In the operation of pumping, this inner tube is reciprocated vertically, it being in fact a hollow sucker rod, and passes out of the tubing, A, at $a'$ through a stuffing box, and from it branches a spout, $a$. This feature of construction is not new, being in common use, and it is not essential to my invention.

B marks the conduit that conveys the gas from the well. From this conduit there is a branch, B', that leads to the intake of the engine, and a second branch, B², leads from the exhaust of the engine back to the conduit, B. Between these two branches is a shut-off valve, $b$, and in each of said branches is also a shut-off valve, $b'$, and $b^2$, respectively. The object of these shut-off valves is as follows: When it is desired to operate the engine, the shut-off, $b$, is closed, and the shut-offs, $b'$ and $b^2$, are opened. This causes the gas from the well to flow through the engine and operate it. If the pressure of the gas is so great as to cause the engine to run too fast the valve, $b$, can be partly opened, and thus allow part of the flow to pass directly along the conduit, B.

When it is not desired to operate the engine, the two shut-offs $b'$ and $b^2$, will be closed, and the shut off, $b$, will be thrown wide open. A branch, B³, from the branch, B², having also a shut-off therein, may, if desired, be provided for the purpose of allowing the engine to exhaust into the atmosphere. When this is in use, the valve, $b^2$, will be closed.

The means by which motion is communicated from the engine to the pump rod or tube, A', may be varied to suit the type of engine used. In the accompanying drawings, as before stated, I have illustrated an engine specially designed for the purposes of my invention, and the means there shown for communicating motion from the engine to the pump rod is specially fitted for the purpose, and may be used in connection with many various types of engines, and is sufficient to illustrate fully my invention. It consists of a working beam, C, mounted on a proper post, E, with the pump rod connected with one end thereof and a counterweight, D, at the other end sufficient to counterweight the weight of the pump tube or rod, and the piston rod, G, of the engine connects with the working beam between the pump and the post at $g$. By thus counterweighting the pump tube or rod the work of the engine will consist only in overcoming the friction of the various parts.

The engine here shown consists of an upright cylinder, F, having a piston chamber of considerable diameter so as to obtain sufficient power for the work to be done from gas at a low effective pressure.

The valve chamber, F', is designed for a hollow piston valve, and is so set that the movement of the valve will be at right angles to the central axis of the cylinder. Ports, $f f$, lead from the valve chamber to the cylinder, and an exhaust port, $f'$, to the discharge nozzle of the engine. The valve is moved by an arm, K', that extends from a rock shaft, K, that is journaled in a yoke, I, that is attached to the cylinder, F. The rock shaft is moved by a bar, K², which is struck by tappets, $h\ h'$ on a vertically moving bar, H', that is carried by an arm, H, extending from the piston rod, G, and is guided in a guide, J', on an arm, J, that extends from the yoke, I. The bar, K², I make hollow, and within it I provide a shifting weight, preferably mercury, which when the bar, K² is moved by the tappets so as to change its inclination will shift to the opposite end of the bar and complete the movement of the bar independent of the tappets, and thus shift the valve, L, at the proper point in the traverse of the piston. The mercury cannot be seen in the drawings, but it is indicated by a dotted line at $k$ in Fig. 1, and the hollow of the bar, K², is shown in Fig. 2.

My said engine may be applied in the manner shown for pumping oil wells which also produce sufficient gas to operate the engine. In such cases when it is not desired to save the gas, and convey it away for use, the engine may exhaust the gas into the atmosphere.

What I claim as new is—

1. The combination with the eduction tube of a gas well; the conduit that conveys gas away from said well; and a pump within said well; of a double acting engine for operating said pump in both directions that receives its propelling force gas, from said well; and means for balancing the vertically moving parts of said mechanism, substantially as described.

2. The combination with the eduction tube of a gas well; the conduit that conveys the gas away from said well; and the pump within said well; of a double acting engine for operating said pump in both directions that receives its propelling force gas, from said well; a working beam connected with the vertically moving parts of said mechanism; and a counter weight on said working beam for balancing the weight of said vertically moving parts.

3. The combination with the eduction tube of a gas well; the conduit that conveys gas away from said well; and the pump within said well; of a double acting engine for operating said pump in both directions, that receives its propelling force gas from said well and exhausts the same into said conduit; a working beam connected with the vertically moving parts of said mechanism; and a counterweight on said working beam for balancing the weight of said vertically moving parts.

4. The combination with the eduction tube of a gas well; and the conduit for conveying gas away from said well; of an engine adapted to be operated by gas as its propelling agent; a branch connection from said conduit to the intake of said engine; a branch connection from the exhaust of said engine back into said conduit; a regulating valve in said conduit between said branches; and means for conveying the exhaust into the atmosphere when desired.

In testimony whereof I affix my signature in presence of two witnesses.

JOHN S. KLEIN.

Witnesses:
JNO. K. HALLOCK,
H. C. LORD.